United States Patent [19]
Wang et al.

[11] Patent Number: 6,054,532
[45] Date of Patent: Apr. 25, 2000

[54] CENTIPEDE POLYMERS GRAFTED WITH HYDROGENATED BLOCK COPOLYMERS AND POLYPROPYLENE AND GELS THEREOF

[75] Inventors: Xiaorong Wang; Victor J. Foltz, both of Akron; James E. Hall, Mogadore, all of Ohio; Hideo Takeichi; Takahiro Matsuse, both of Kodaira, Japan; Naruhiko Mashita, Yokohama, Japan; Shinichi Toyosawa, Tokorozawa, Japan

[73] Assignee: Bridgestone Corporation, Tokyo, Japan

[21] Appl. No.: 09/073,617

[22] Filed: May 6, 1998

[51] Int. Cl.⁷ .................................................. C08G 61/02
[52] U.S. Cl. .................. 525/66; 525/69; 525/71
[58] Field of Search ................... 525/66, 69, 71

[56] References Cited

U.S. PATENT DOCUMENTS

| | | |
|---|---|---|
| 3,414,551 | 12/1968 | Reid et al. . |
| 3,480,580 | 11/1969 | Joyner et al. . |
| 3,481,910 | 12/1969 | Brunson et al. . |
| 3,577,365 | 5/1971 | Folzenlogen et al. . |
| 3,862,265 | 1/1975 | Steinkamp et al. . |
| 4,506,056 | 3/1985 | Gaylord . |
| 4,777,212 | 10/1988 | Kress et al. ............... 525/67 |
| 5,047,470 | 9/1991 | Whalen et al. ............ 525/64 |
| 5,081,186 | 1/1992 | Mitsuno et al. ........... 525/71 |
| 5,225,483 | 7/1993 | Datta et al. ............... 525/75 |
| 5,244,971 | 9/1993 | Jean-Marc . |
| 5,270,387 | 12/1993 | Sheilds et al. ............ 525/71 |
| 5,298,558 | 3/1994 | Sullivan et al. ........... 525/66 |
| 5,420,198 | 5/1995 | Papazoglou et al. ...... 525/66 |

FOREIGN PATENT DOCUMENTS

| | | |
|---|---|---|
| 0 322 905 | 12/1988 | European Pat. Off. . |
| 0 536 753 A1 | 4/1993 | European Pat. Off. . |
| 0 196 872 A2 | 10/1996 | European Pat. Off. . |
| 0 879 832 A1 | 11/1998 | European Pat. Off. . |
| 42 41 538 A1 | 6/1994 | Germany . |
| 5-202263 | 8/1993 | Japan . |
| 6-248017 | 9/1994 | Japan . |

OTHER PUBLICATIONS

L.E. Colleman, Jr., J.F. Bork, and H. Donn Jr., J. Org. Chem., 24, 1895 (1959).

A. Matsumoto, Y. Oki, and T. Otsu, Polymer J., 23,(3), 201 (1991).

CA 125; 87670q (1996) L. Haeussler, U. Wienhold, V. Albrecht, and S. Zschoche, Thermochim. Acta, 277, 14 (1986).

W. Kim, and K. Seo, Macromol. Rapid Communi., 17, 835 (1996).

W. Lee, and G.Hwong, J. Appl. Polym. sci., 59, 599 (1996).

I. Vermeesch and G. Groeninckx, J. Appl. Polym. Sci., 53, 1365 (1994).

Y. Kita, K. Kishino, and K. Nakagawa, J. Appl. Ploymer. Sci. 63, 1055 (1997).

*Primary Examiner*—Jeffrey C. Mullis
*Attorney, Agent, or Firm*—David G. Burleson; Daniel N. Hall; Aaron B. Retzer

[57] ABSTRACT

The present invention teaches a method for enabling the formation of a high damping, soft polymer gel. The method includes: reacting a poly(alkenyl benzene-co-maleimide) polymer with a maleated polyalkylene and a maleated hydrogenated block copolymer and an alkyl diamine grafting agent under substantially dry conditions sufficient to form a hydrogenated block copolymer-polyalkylene grafted poly(alkenyl benzene-co-maleimide) polymer product; and, dispersing the hydrogenated block copolymer-polyalkylene grafted poly(alkenyl benzene-co-maleimide) polymer product with an extender oil sufficient to form the gel. The present invention also contemplates a polymer gel composition, a polymer composition and an article manufactured from the polymer gel composition.

26 Claims, No Drawings

CENTIPEDE POLYMERS GRAFTED WITH HYDROGENATED BLOCK COPOLYMERS AND POLYPROPYLENE AND GELS THEREOF

FIELD OF THE INVENTION

This invention relates to the production of grafted copolymers by grafting poly(alkenyl benzene-co-maleimide) polymers with a blend of maleated polyalkylene and maleated hydrogenated block copolymer and to the use of oil extended graft copolymers in producing high damping gel materials.

BACKGROUND OF THE INVENTION

The polymerization of styrene and maleic anhydride by free radical initiation is well known in the prior art. Similarly, poly(styrene-co-maleic anhydride) polymer is well known. Further, imidization between a maleic anhydride and a primary amine group is a commonly known chemical reaction. Patent publications which have recognized these reactions include: German Patent DE 4241538, assigned to Leuna-Werke A.-G; Japanese Patent JP 94248017, assigned to other non-patent publications have also recognized these reactions. Included among them are: L. E. Colleman, Jr., J. F. Bork, and H. Donn, Jr., J. Org. Chem., 24, 185(1959); A Matsumoto, Y. Oki, and T. Otsu, Polymer J., 23 (3), 201(1991); L. Haeussler, U. Wienhold, V. Albricht, and S. Zschoche, Themochim. Acta, 277, 14(1966); W. Kim, and K. Seo, Macromol. Rapid Commun., 17 835(1996); W. Lee, and G. Hwong, J. Appl. Polym. Sci., 59 599(1996); and, I. Vermeesch and G. Groeninkx, J. Appl. Polym. Sci., 53, 1356(1994).

The synthesis of monofunctional N-alkyl and N-aryl maleimides are also well known in the prior art. They have been extensively used to improve the heat stability of homo- and especially copolymers prepared from vinyl monomers. Typically, the bulk resins comprise ABS (poly(acrylonitrile-co-butadiene-co-styrene)) or a polyblend of poly (acrylonitrile-co-butadiene) and poly(styrene-co-acrylonitrile); PVC (poly(vinyl chloride)); SAN (poly(styrene-co-acrylonitrile)); PMMA (poly-(methyl methacrylate)); and the like. The maleimides can be copolymerized with other monomers such as acrylonitrile, butadiene, styrene, methyl methacrylate, vinyl chloride, vinyl acetate and many other comonomers. A more preferred practice in the industry is to produce copolymers of maleimides with other monomers such as styrene and optionally acrylonitrile and to blend these with ABS and SAN resins. In any event, the polymer compositions are adjusted so that the copolymers are fully compatible with the bulk resins (e.g., ABS and/or SAN) as shown by the presence of a single glass transition point (T(g)) as determined by differential scanning calorimetry (DSC).

It has long been recognized that two or more polymers may be blended together to form a wide variety of random or structured morphologies to obtain products that potentially offer desirable combinations of characteristics. However, it may be difficult or even impossible in practice to achieve many potential combinations through simple blending because of some inherent and fundamental problem. Frequently, the two polymers are thermodynamically immiscible, which precludes generating a truly homogeneous product. This immiscibility may not be a problem since often it is desirable to have a two-phase structure. However, the situation at the interface between these two phases very often does lead to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structured morphologies impossible.

It is particularly desirable to prepare a grafted copolymer having the impact strength of polypropylene and the elastomeric properties of a block copolymers. It is also desireable to add an extender or plasticizer to the resultant grafted copolymer in order to obtain a copolymer having a low Shore A hardness.

OBJECTS OF THE INVENTION

Accordingly, it is an object of this invention to produce a grafted "centipede" polymer having maleated polypropylene and maleated hydrogenated block copolymer grafted onto a poly(alkenyl benzene-co-maleimide).

More specifically, it is an object of this invention to provide an oil or low molecular weight component extended grafted "centipede" polymer of maleated polypropylene and maleated hydrogenated block copolymer grafted onto a poly(alkenyl benzene-co-maleimide) that is useful in producing high damping and soft materials.

Another object of the invention is to provide oil or low molecular weight component extended grafted centipede polymers that exhibit improved properties, including low Shore A hardness less than 50, high damping properties and a service temperature of about 100° C.

SUMMARY OF THE INVENTION

The present invention is directed to an oil or low molecular weight component extended grafted "centipede" polymer of maleated polypropylene and maleated hydrogenated block copolymer grafted onto a poly(alkenyl benzene-co-maleimide) useful in producing molded products having heat resistance and a high elasticity and damping properties.

The present invention is broadly directed to grafted polymer compositions of a maleated polypropylene and a maleated hydrogenated block copolymer grafted onto a poly (alkenyl benzene-co-maleimide) using a diamine grafting agent. It is further directed to a process for preparing an oil extended grafted polymer compositions broadly comprising a maleated polypropylene and a maleated hydrogenated block copolymer grafted to a functionalized thermoplastic material, namely a poly(alkenyl benzene-co-maleimide), under conditions sufficient to permit grafting of the functionalized polypropylene and hydrogenated block copolymer with the functionalized thermoplastic material.

DETAILED DESCRIPTION OF THE INVENTION

The extended grafted polymer gels of the present invention contain: 100 parts by weight of a grafted polymer of a poly(alkenyl benzene-co-maleimide) having at least one maleated polypropylene segment and at least one maleated hydrogenated block copolymer segment grafted thereto through a functional linkage formed by a crosslinking reaction with a diamine grafting agent; and an extender such as an oil or a low molecular weight component in an amount suitable to form a gel, preferably at least 10 up to 1,000 parts by weight.

The poly(alkenyl benzene-co-maleimide) is a "centipede" polymer formed by imidizing a poly(alkenyl benzene-co-maleic anhydride) with a primary amine. The "centipede" polymer has a high molecular weight spine connected with many relatively short side chains formed from the addition of the primary amines. The length of the main chain usually equals or is longer than the entanglement length, which is herein defined theoretically as an order of magnitude of 100 repeating units, while the length of the side chains is much smaller than the entanglement length.

The preferred alkenyl benzenes contributed monomer units of the poly(alkenyl benzene-co-maleimide) "centipede" polymer are either styrene or alpha-methylstyrene. The terms "alkenyl benzene" and "vinyl aromatic" are understood to be interchangeable as used herein.

The poly(alkenyl benzene-co-maleimide) described herein are subsequently graft-reacted through a difunctional linking or grafting agent to a blend of maleated polypropylene and maleated hydrogenated block copolymer such as a maleated hydrogenated styrene/butadiene/styrene block copolymer to yield a grafted polymer having at least one polypropylene and at least one hydrogenated block copolymer segment grafted thereto through functional linkages thus formed.

The maleated polypropylene may be any of the conventionally known polypropylene compounds that are subsequently maleated by methods known in the art. The polypropylene grafted segment or segments have molecular weights "$M_w$" of about 10,000 up to about 10,000,000, or higher, preferably about 20,000 to about 300,000.

The crystallinity, or tacticity, of the polypropylene may vary from being substantially amorphous to being completely crystalline, that is from about 10–100% crystallinity. Most typically, because of the extensive commercial use of isotactic polypropylene, the grafted polypropylene will be substantially crystalline, e.g., greater than about 90%. Generally, the polypropylene is substantially free of ethylene. However, under certain circumstances small amounts of ethylene, on the order of less than about 10% by weight, may be incorporated. Furthermore, in certain instances the polypropylene contain small amounts of ethylene in copolymers known as "reactor copolymers". Thus, it is within the scope of the invention that the grafted polypropylene contain minor amounts of ethylene, both as part of ethylene-propylene segments and as polyethylene segments.

Polymerization conditions for the preparation of polypropylene are well known in the art. Propylene can be polymerized into isotactic polypropylene in the presence of stereo-specific Ziegler-Natta catalyst systems comprising compounds of the transition metals of Groups 4 to 6 and 8 of the Periodic Table of elements, preferably titanium compounds, most preferably titanium halides, and organometallic compounds of elements of groups 1 to 3 of the Periodic Table, especially aluminum alkyls or aluminum alkyl halides. Illustrative examples include titanium trichloride, titanium tetrachloride as catalysts and triethylaluminum and diethyl aluminum chloride as cocatalysts. These transition metal catalyst systems can be non-supported or supported, for example, silica gel, or metal oxides and dihalides, such as MgO, $MgCl_2$, $ZnCl_2$, etc. Such systems can be reacted together and can be complexed with a variety of Lewis-base electron donors.

Molecular weight control is typically achieved by the incorporation of hydrogen via a feed stream into the polymerization reactor. The hydrogen is added at about 0 to 30 mole % based on the total monomer. The polymerization reaction is preferably conducted according to the slurry method employing an inert hydrocarbon diluent or liquid propylene as the vehicle. The polymerization temperature can be in the range of about 50° C. to about 100° C. and is preferably at a range or about 60° C. to about 80° C. Polymerization pressure can also vary over a wide range and is not particularly limited. The polymerization pressure can for example be in the range from between atmospheric pressure to 37,000 KPa. Such procedures and components are only illustrative of the knowledge in the art with respect to polypropylene polymerization, any are contemplated as useful within the scope of the invention. For general review of literature and patents in the art see "Olefin Polymers (Polypropylene)" in the Kirk-Othmer Encyclopedia of Chemical Technology, 3rd Edition v. 16, 453–469 (J. Wiley & Sons, 1981).

In the present invention, the hydrogenated block copolymer that is subsequently maleated is obtained by hydrogenating a block copolymer comprising at least two polymer blocks A composed mainly of a vinyl-substituted aromatic hydrocarbon and at least one polymer block B composed mainly of a conjugated diene. This hydrogenated block copolymer has the polymer structure of hydrogenated products of vinyl-substituted aromatic hydrocarbon/ conjugated diene block copolymers represented by the formulae such as for example $(A-B-)_{(n)}A$, $(B-A-B-)_{(n)}A$, $(B-A-B-)_{(n)}A-B$, $(A-B-)_{(m)}X$, $(B-A-B-)_{(m)}Y$, etc., wherein n is an integer of 1 or more, m is an integer of 2 or more and X represents a coupling or polyfunctional initiator residue having two or more functional groups.

This hydrogenated block copolymer contains 5 to 60 wt. %, preferably 10 to 50 wt. % of a vinyl-substituted aromatic hydrocarbon. Referring now to its block structure, the polymer block A composed mainly of a vinyl-substituted aromatic hydrocarbon has the structure of the homopolymer block of a vinyl-substituted aromatic hydrocarbon or the copolymer block of a vinyl-substituted aromatic hydrocarbon containing more than 50 wt. %, preferably not less than 70 wt. % of vinyl-substituted aromatic hydrocarbon with a hydrogenated conjugated diene and the polymer block B composed mainly of a hydrogenated conjugated diene has the structure of the homopolymer block of a hydrogenated conjugated diene or the copolymer block of a hydrogenated conjugated diene containing more than 50 wt. %, preferably not less than 70 wt. % of hydrogenated conjugated diene with a vinyl-substituted aromatic hydrocarbon. Also, as to the distribution of the hydrogenated conjugated diene or the vinyl-substituted aromatic hydrocarbon contained in the molecular chains of the polymer block A composed mainly of a vinyl-substituted aromatic hydrocarbon and the polymer block B composed mainly of a hydrogenated conjugated diene, the both polymer blocks may take any of random, tapered (the monomer components increase or decrease along the molecular chain) and partial block arrangements and combinations thereof; and when the numbers of both said polymer blocks A and B are 2 or more, the structures of the respective polymer blocks may be the same or different.

The vinyl-substituted aromatic hydrocarbon constituting the hydrogenated block copolymer is one or more members selected from the group consisting of styrene, α-methyl styrene, vinyl toluene, p-tert-butyl styrene, etc. Of these compounds, styrene is preferred. A conjugated diene before hydrogenation constituting the hydrogenated conjugated diene is one or more members selected from the group consisting of butadiene, isoprene, 1,3-pentadiene, 2,3-dimethyl-1,3-butadiene, etc. Of these, butadiene, isoprene and combination of the both are preferred. The polymer block composed mainly of a conjugated diene before hydrogenation may contain any amount, expressed by mole %, of the conjugated diene micro structure, and for example a polybutadiene block contains 20 to 50 mole %, preferably 25 to 45 mole % of the 1,2-vinyl bond.

Suitable hydrogenated block copolymers for use in the present invention include but are not limited to: styrene-ethylene/butylene-styrene block copolymer (SEBS), styrene-ethylene/butylene block copolymer (SEB), styrene-ethylene/propylene-block copolymer (SEP), styrene-ethylene/propylene-styrene block copolymer (SEPS), styrene-ethylene/propylene-ethylene block copolymer (SEPE), styrene-ethylene/butylene-ethylene block copolymer (SEBE), styrene-ethylene/styrene block copolymer (SES), ethylene-ethylene/butylene block copolymer (EEB), ethylene-ethylene/butylene/styrene block copolymer (hydrogenated BR-SBR block copolymer), ethylene-ethylene/butylenelstyrene-ethylene block copolymer (hydrogenated BR-SBR-BR block copolymer), ethylene-ethylene/butylene-ethylene block copolymer (EEBE) and the like and mixtures thereof. The preferred hydrogenated block copolymer for use in the present invention is styrene-ethylene/butylene-styrene block copolymer (SEBS).

The hydrogenated block copolymers of the above structures used in the present invention have a number average molecular weight in a range of from 5,000 to 1,000,000, preferably from 50,000 to 800,000, more preferably 70,000 to 500,000, and the molecular weight distribution ratio (Mw/Mn) of weight average molecular weight (Mw) to number average molecular weight (Mn) is 10 or less. The molecular structure type of the hydrogenated block copolymer may be any of straight-chain, branched involving partial coupling with a coupling agent, radial and the star-shaped types and combinations thereof There is no limitation to a method for producing these hydrogenated block copolymers, so far as they have the structure described above. These copolymers can be obtained by synthesizing a vinyl-substituted aromatic hydrocarbon/conjugated diene block copolymer in an inert solvent using an organo-lithium and if necessary, a 1,2-vinyl bond modifier such as ether compounds, tertiary amines, etc. according to the methods, for example, disclosed in British Patent No. 1,130,770 and U.S. Pat. Nos. 3,281,383 and 3,639,517, and then hydrogenating the resulting block copolymer according to the well-known methods, for example, disclosed in British Patent No. 1,020,720 and U.S. Pat. Nos. 3,333,024 and 4,501,857. In this case, the polymer block composed mainly of the conjugated diene can be changed in form to the polymer block of an olefinic compound by hydrogenating at least 80 mole % of the aliphatic double bond coming from the conjugated diene of the vinyl-substituted aromatic hydrocarbon/conjugated diene block copolymer.

There is no particular limitation to the hydrogenation ratio of the aromatic double bond coming from the polymer block A composed mainly of the vinyl-substituted aromatic hydrocarbon and the vinyl-substituted aromatic hydrocarbon which has been incorporated as a co-monomer, as need arises, in the polymer block B composed mainly of the conjugated diene, but the hydrogenation ratio is preferably 80 mole % or more. The amount of unhydrogenated aliphatic double bond contained in the hydrogenated block copolymer can easily be known by infrared spectrophotometer, nuclear magnetic resonance apparatus, etc.

While it is desirable to utilize commercially available maleated polypropylene and maleated hydrogenated block copolymer, such as maleated SEBS, the polypropylene and hydrogenated block copolymer may be prepared using maleating procedures or techniques that are well known to those skilled in the art. In such a typical procedure, maleinization of either polypropylene or a hydrogenated block copolymer to maleated polypropylene or maleated hydrogenated block copolymer respectively, is conveniently accomplished by heating polypropylene or hydrogenated block copolymer and ethylenically unsaturated carboxyl group-containing compounds, e.g., maleic anhydride, within a range of about 150° to 400° C., often in the presence of free-radical initiators such as organic peroxides that are well-known in the art. Free-radical grafting of the carboxyl group-containing compounds onto the polypropylene or the hydrogenated block copolymer readily results. Methods of preparing these grafted polymers are well-known in the art as illustrated, inter alia, in U.S. Pat. Nos. 3,480,580, 3,481,910, 3,577,365, 3,862,265, 4,506,056, and 3,414,551 the disclosures of which are incorporated herein by reference. Such processes are well-known in the art, for example, an independent source of the description of the process is found in Y. Minoura, M. Ueda, S. Mizinuma and M. Oba, J. Applied Polymer Sci. 1625 (1969). The use of heat and/or physical shearing optionally with the free-radical initiators, in such equipment as extruders, masticators, and the like, to simultaneously accomplish controlled degradation in molecular weight of the polypropylene along with the free-radical grafting of the maleic anhydride, as is known in the art, will be useful in accordance with this invention.

In particular, it is preferable to conduct the maleinization with such amounts of maleic anhydride and free-radical initiators, and under conditions of temperature and shearing such that free-radical sites on the polypropylene or hydrogenated block copolymer are formed substantially at the time of scission of the polypropylene or hydrogenated block copolymer chains and are formed at the point of such scission. The maleic anhydride is then grafted onto the scissioned end of one side of such broken chains. In this manner the anhydride groups are located principally at the ends of the maleated chains, and the substantial majority of such maleated polypropylene or hydrogenated block copolymer chains contain one site of maleinization. This procedure permits grafting of the maleated polypropylene and maleated hydrogenated block copolymer at their maleated ends to the maleated poly(alkenyl benzene-co-maleimide) block copolymer though the use of a difunctional linking or grafting agents having two functional groups each functional group being reactive with a maleate group on the polypropylene and hydrogenated block copolymer and poly(alkenyl benzene-co-maleimide) block copolymer. Multiple sites of maleinization can lead to grafting of the maleated polypropylene or hydrogenated block copolymer to more than one maleated poly(alkenyl benzene-co-maleimide) block copolymer polymer chain or at more than one site of one or more maleated poly(alkenyl benzene-co-maleimide) block copolymer. The same substantial chemistry applies to the centipede polymers of the present invention.

In accordance with the above, the free-radical initiator is preferably used and will typically be utilized in an amount of from about 0.01 to 1.0 wt. %, preferably from about 0.02 to 0.5 wt. %, and most preferably from about 0.04 to 0.3 wt. % of the total polypropylene and hydrogenated block copolymer, and solvent if used, and will be added first. The mixture is then heated to a temperature at or about the known decomposition temperature of the selected free-radical initiator, concurrently with any optional mechanical shearing. The maleic anhydride is subsequently added in an amount typically from about 0.01 to 10.0 wt. %, preferably from about 0.1 to 5 wt. %, and most preferably about 0.75 to 2 wt. % of the total polypropylene or hydrogenated block copolymer.

The maleated polypropylene and the maleated hydrogenated block copolymer of this invention each contain from about 0.01 wt. % incorporated maleic anhydride, based upon the weight of the maleated polypropylene and the maleated hydrogenated block copolymer respectively, up to about 5 wt. %. Preferably the maleic anhydride content will be from about 0.01 to about 2 wt. %, most preferably about 0.03 to about 0.2 wt. %. As will be apparent, unreacted polypropylene or hydrogenated block copolymer will also be present in the reaction mix as will minor amounts of reaction by-products, such as decomposed free-radical initiator compounds and low molecular weight free-radical products. These by-products are substantially removed, by methods known in the art, e.g., sparging with nitrogen or washing with water. Maleic anhydride may not be left in substantial amounts in the polymer without detrimental affects on the subsequent reaction of the poly(maleimide-co-alkenyl benzene) with the maleated polypropylene and the maleated hydrogenated block copolymer.

The poly(alkenyl benzene-co-maleimide) of the present invention is formed by reacting a poly[alkenylbenzene-(co)-(maleic anhydride)] at from about 100° C. to about 250° C. and from about slightly above vacuum to about 20 atmospheres, under substantially dry conditions in the presence of a primary amine. The present invention is preferably directed to a polymer compositions of a poly(styrene-co-maleimide) formed by reacting a poly(styrene-co-maleic anhydride) with a primary amine.

For the purposes of this invention, poly(alkenyl benzene-co-maleimide) and poly(alkyl benzene-co-maleic anhydride) are defined to encompass random and stereospecific copolymers, including copolymers having alternating alkenyl benzene and maleimide or maleic anhydride contributed monomer units along the polymer backbone. Such alternating structure are typically described as poly (alkenyl benzene-alt-maleimide) and poly(alkyl benzene-alt-maleic anhydride); however, these polymers are encompassed herein within the descriptions poly(alkenyl benzene-co-maleimide) and poly(alkyl benzene-co-maleic anhydride).

Processes for forming poly(alkyl benzene-co-maleic anhydride) polymers are well known to those skilled in the art. The preparation of the copolymers from electron donor monomers, such as styrene, and electron acceptor monomers, such as maleic anhydride, as a result of complexation of the electron acceptor monomers may be carried out in the absence as well as in the presence of an organic free radical initiator in bulk, or in an inert hydrocarbon or halogenated hydrocarbon solvent such as benzene, toluene, hexane, carbon tetrachloride, chloroform, etc. (N. G Gaylord and H. Antropiusova, Journal of Polymer Science, Part B, 7, 145 (1969) and Macromolecules, 2, 442 (1969); A. Takahashi and N. G. Gaylord, Journal of Macromolecular Science (Chemistry), A4, 127 (1970).

Poly(alkyl benzene-co-maleic anhydride) polymers are prepared by reacting monomers of alkenylbenzene with maleic anhydride. The preferred alkenyl benzene monomers used for forming the poly(alkyl benzene-co-maleic anhydride) polymer are styrene or a-methylstyrene. Suitable, but less preferred substitutes are: p-methylstyrene, 4-phenylstyrene, m-methylstyrene, o-methylstyrene, p-tert-butylstyrene, dimethylstyrene, and combinations thereof The poly(alkyl benzene-co-maleic anhydride) for use in the present invention is a polymer containing from about 5 to 99 mole percent of maleic anhydride monomer with the remainder being alkyl benzene monomer. The preferred poly(alkyl benzene-co-maleic anhydride) contains from 20 to 50 mole percent of maleic anhydride monomer. The most preferred poly(alkyl benzene-co-maleic anhydride) for use in the present invention is poly(styrene-co-maleic anhydride) containing 50 mole percent of maleic anhydride monomer and 50 mole percent of styrene monomer. The comonomers, maleic anhydride and alkenyl benzene, can be randomly or alternatingly distributed in the chain, however, it is preferred to have these comonomers alternating along the polymer backbone chain.

The poly(alkenyl benzene-co-maleic anhydride) has a molecular weight range between about 1,000 and up to about 500,000 or higher, more typically between about 10,000 and 500,000, and even more typically between about 150,000 and 450,000, where the molecular weight is weight-average ("$M_w$").

The poly(alkenyl benzene-co-maleimide) of the present invention is formed by reacting a poly(alkyl benzene-co-maleic anhydride) in the presence of a mono-primary amine at a temperature from about 100° C. to about 300° C. and at a pressure from about slightly above vacuum to about 20 atmospheres, under substantially dry conditions. The reactants are preferably dry mixed in the absence of solvents in a suitable mixing apparatus such as a Brabender mixer. It is preferable to purge the mixer with nitrogen prior to the charging of the reactants. The primary amine may be added in a singular charge or in sequential partial charges into the mixer containing a charge of poly(alkyl benzene-co-maleic anhydride). Preferably the primary amine is charged in ratio between 0.8 to 1.0 of moles of amine per monomer contributed units of maleic anhydride in the poly(alkyl benzene-co-maleic anhydride).

Suitable primary amine include but are not limited to: alkyl amines; alkyl benzyl amines; alkyl phenyl amines; alkoxybenzyl amines; alkyl aminobenzoates; alkoxy aniline; and other linear primary amines containing from 1 to 50 carbon atoms, preferably 6 to 30 carbon atoms, in the alkyl and alkoxy substituents in these primary amines. It is understood that the alkyl and alkoxy substituents on the above discussed primary amines can be linear or branched, preferably linear, and saturated or unsaturated, preferably saturated. Exemplary, but not exclusive of such amines are: hexylamine, octylamine, dodecylamine and the like.

The poly(alkenyl benzene-co-maleimide), prior to grafting with maleated polypropylene and hydrogenated block copolymer, preferably has a molecular weight range between about 1,000 and up to about 500,000 or higher, more typically between about 10,000 and 500,000, and even more typically between about 150,000 and 450,000, where the molecular weight is weight-average ("$M_w$").

The polymers of the present invention may be prepared by any means well known in the art for combining such ingredients, such as blending, milling or internal batch mixing. A rapid and convenient method of preparation comprises heating a mixture of the components to a temperature of about 50° C. to about 290° C.

The poly(alkenyl benzene-co-maleimide) centipede polymers of this invention are preferably manufactured by mixing and dynamically heat-treating the components described above, namely, by melt-mixing. As for the mixing equipment, any conventional, generally known equipment such as an open-type mixing roll, closed-type Banbury mixer, closed type Brabender mixer, extruding machine, kneader, continuous mixer, etc., is acceptable. The closed-type Brabender mixer is preferable, and mixing in an inactive gas environment, such as nitrogen or argon, is also preferable.

Grafting of maleated polypropylene and maleated hydrogenated block copolymer with poly(alkenyl benzene-co-maleimide) is performed by adding a grafting agent such as a polyamine, preferably an organic diamine, to a blend of maleated polypropylene and poly(alkenyl benzene-co-maleimide) to partially crosslink the polypropylene to the poly(alkenyl benzene-co-maleimide) through the maleate functional groups.

Suitable organic diamines or diamine mixtures containing two aliphatically or cycloaliphatically bound primary amino groups are used as grafting agents for the process according to the present invention. Such diamines include, for example, aliphatic or cycloaliphatic diamines corresponding to the following general formula: $R_1(NH_2)_2$ wherein $R_1$ represents an aliphatic hydrocarbon group having from 2 to 20 carbon atoms, a cycloaliphatic hydrocarbon group having from 4 to 20 carbon atoms, or an aromatic hydrocarbon group having from 6 to 20 carbon atoms or $R_1$ represents an N-heterocyclic ring having from 4 to 20 carbon atoms, e.g., ethylene diamine; 1,2- and 1,3- propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-; 1,4-; 1,5- and 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-amino-cyclohexyl)-propane; 3,3'-dimethyl4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline, 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine, o-phenylenediamine, methylenebis(o-chloroaniline); bis(3,4-diaminophenyl) sulfone; diaminodiphenylsulfone; 4-chloro-o-phenylenediamine; m-amino-benzylamine; m-phenylenediamine; 4,4'-$C_1$–$C_6$-dianiline such as 4,4'-methylenedianiline; aniline-formaldehyde resin; and trimethylene glycol di-p-aminobenzoate. Mixtures of these diamines may also be used.

Other suitable polyamines for use as grafting agents in the process according to the present invention include bis-(aminoalkyl)-amines, preferably those having a total of from 4 to 12 carbon atoms, e.g., bis-(2-aminoethyl)-amine, bis-(3-aminopropyl)-amine, bis-(4-aminobutyl)-amine and bis-(6-aminohexyl)-amine, and isomeric mixtures of dipropylene triamine and dibutylene triamine. Hexamethylene diamine, tetramethylene diamine, and especially 1,12-diaminododecane are preferably used.

Thus in the preferred embodiment the process for preparing the grafted polymer of this invention comprises the steps of:

(A) combining a commercially available poly [alkenylbenzene-(co)-(maleic anhydride)] and a primary amine under substantially dry conditions sufficient to react substantially most of the acid anhydride moieties to form the poly(alkenyl benzene-co-maleimide); and, (B) sequentially or simultaneously mixing a maleated polypropylene and a maleated hydrogenated block copolymer, such as a maleated SEBS, with the mass of step (A) under substantially dry conditions of elevated temperature;

(C) adding a diamine to the reaction mass of step (B), under a condition of agitation sufficient to form the grafted polymer of the present invention and cooling; and, (D) adding an extender oil to the final polymer of step (C) under conditions of agitation.

In broadest terms the process for preparing the grafted polymer of this invention comprises sequentially or simultaneously combining a poly(alkenyl benzene-co-maleimide) with a maleated polypropylene, a maleated hydrogenated block copolymer, and a grafting agent under conditions sufficient to permit grafting of at least a minor portion of the poly(alkenyl benzene-co-maleimide) onto the polypropylene and the hydrogenated block copolymer. Thus the grafted centipede polymer composition of this invention will comprise the reaction product of the above described poly (alkenyl benzene-co-maleimide) grafting agent, maleated polypropylene and maleated hydrogenated block copolymer. The grafting reaction is accomplished by contacting the grafting agent and the poly(alkenyl benzene-co-maleimide) with the maleated polypropylene and the maleated hydrogenated block copolymer whereupon interaction and cross linking take place. Apparently the primary amino groups of the grafting agent react to form covalent chemical bonds (imide bonds) with the maleic moieties of the maleated polypropylene, the maleated hydrogenated block copolymer and the poly(alkenyl benzene-co-maleimide). Both the hydrogenated block copolymer and polypropylene moieties are thus grafted to the poly(alkenyl benzene-co-maleimide) through covalent chemical functional linkages.

For best results, a proportion of approximately one-half molar equivalent of grafting agent per molar equivalent of maleic moiety can be employed due to the difunctionality of the grafting agent. The mixing or contacting of reactive components can be accomplished by combining solutions of the polymeric reactants in suitable solvents, such as benzene, toluene, xylene and other inert organic and inorganic solvents, in a suitable reaction vessel under substantially anhydrous conditions. Heating will accelerate the reaction and is generally preferred. More preferably commercially, the contacting can be accomplished by premixing pre-formed pellets of the neat functionalized polymers and adding the grafting agent and melt processing in a physical blender or mixer, such as a Brabender mixer or an extruder, at temperatures of from about ambient to about 350° C., preferably about 75° to about 300° C., and most preferably 120° C. to about 250° C. It is important that essentially all moisture or water be removed by drying prior to contacting the polymer reactants in order to avoid hydrolysis reactions which will compete with the sought cross linking and reduce the yield of the grafted copolymer composition of this invention.

The amounts of poly(alkenyl benzene-co-maleimide) and of both maleated polypropylene and maleated hydrogenated block copolymer reacted into the grafted compositions of the invention may vary somewhat depending upon the properties desired in the finished composition. In general, the combined total amount of maleated polypropylene and the maleated hydrogenated block copolymer included in the grafted composition may range from about 1 to about 90 percent by weight based on total weight of composition.

Preferred amounts of maleated polypropylene and the maleated hydrogenated block copolymer are from 30 to 90 percent by weight with a particularly preferred amount being from 50 to 90 percent by weight. The amounts of poly(alkenyl benzene-co-maleimide) centipede polymer included in the grafted composition may range from about 99 to about 10 percent by weight based on total weight of composition. Preferred amounts of the centipede polymer are from 70 to 10 percent by weight with a particularly preferred amount being from 50 to 10 percent by weight.

The weight ratio of maleated polypropylene to maleated hydrogenated block copolymer used in the preparation of the graft copolymers of the present invention is in the range from 10:1 to 1:10, preferably 5:1 to 1:5.

The centipede polymer gels of the present invention have an extender added to the prepared grafted copolymers during final processing. Suitable extenders include extender oils and low molecular weight compounds or components. Suitable extender oils include those well known in the art such as naphthenic, aromatic and paraffinic petroleum oils and silicone oils.

Examples of low molecular weight organic compounds or components useful as extenders in the compositions of the present invention are low molecular weight organic materials having a number-average molecular weight of less than 20,000, preferable less than 10,000, and most preferably less than 5,000. Although there is no particular limitation to the material which may be employed, the following is a list of examples of appropriate materials:

(1) Softening agents, namely aromatic naphthenic and paraffinic softening agents for rubbers or resins;
(2) Plasticizers, namely plasticizers composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether and polyester plasticizers for NBR;
(3) Tackifiers, namely coumarone resins, coumarone-indene resins, terpene phenol resins, petroleum hydrocarbons and rosin derivative;
(4) Oligomers, namely crown ether, flourine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-α-olefins;
(5) Lubricants, namely hydrocarbon lubricants such as paraffin and wax, fatty acid lubricants such as higher fatty acid and hydroxy-fatty acid, fatty acid amide lubricants such as fatty acid amide and alkylene-bis-fatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants; and,
(6) Petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins.

Other appropriate low-molecular weight organic materials include latexes, emulsions, liquid crystals, bituminous compositions, and phosphazenes. One or more of these materials may be used as extenders.

In accordance with the present invention, a gel is formed with the grafted copolymer of the present invention by adding by mixing an extender such as oil in an amount suitable to form a gel, such as at least about 10, preferably 30 to 1,000, parts by weight of extender per 100 parts by weight of the grafted copolymers. Most preferred amounts of added extender include from about 50 to about 500 parts of oil per 100 parts of grafted copolymer and ideally about 80 to about 300 parts of extender per 100 parts of grafted copolymer. The weight percent ratio of the polyalkylene grafted poly(alkenyl benzene-co-maleimide) to the extender is from about 100:1 to about 1:100, preferably 5:1 to about 1:5.

The polymer gels produced according to the present invention generally have high damping properties having a tan δ in the range of about 0.1 to about 1.0, preferably higher than 0.3 over the temperature range of 30° C. to 100° C., and a Shore A hardness ranging from 0 to about 50, preferably about 0 to about 30, most preferably about 5 to 20 at about 20° C. to 25° C. or at room temperature. The service temperature of the gels of the present invention is less than or equal to 100° C. for most of the polymers of the present invention, e.g., 100° C. compression set of the gel is about 50. Some of the extended polymers of the present invention have a potential use up to 140° C.

It is frequently desirable to include other additives well known in the rubber art to the compositions of the present application. Stabilizers, antioxidants, conventional fillers, reinforcing agents, reinforcing resins, pigments, fragrances and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris(nonylphenyl) phosphite, 2,6-di-t-butyl-4-methylphenol and the like. Exemplary conventional fillers and pigments include silica, carbon black, titanium dioxide, iron oxide and the like. These compounding ingredients are incorporated in suitable amounts depending upon the contemplated use of the product, preferably in the range of 1 to 350 parts of additives or compounding ingredients per 100 parts of grafted copolymer.

A reinforcement may be defined as the material that is added to a resinous matrix to improve the strength of the graft copolymers. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion and processability. Examples of other elastomers and resins include adhesive-like products including Reostomer (produced by Riken-Vinyl Inc.), hydrogenated polystyrene-(medium or high 3,4) polyisoprene-polystyrene block copolymers such as Hybler (produced by Kurare Inc.), polynorbornenes such as Norsorex (produced by Nippon Zeon Inc.) and the like. The compositions of the present invention may be prepared by any means well known in the art for combining such ingredients, such as solution blending, milling, internal batch mixing, or continuous extrusion of a solid form of the polymers and the other ingredients. A rapid and convenient method of preparation comprises heating a mixture of the components to a temperature of about 50° C. to about 290° C.

The composition of the present invention can be mixed in any conventional mixer such as an open-type mixing roll, closed-type Banbury mixer, extruding machine, kneader and continuous mixer normally conducted within the temperature range of about 120° C. to about 300° C., preferably maintaining the composition above its melting point for a few minutes up to several hours, preferably 10 to 40 minutes. A closed-type mixer is preferable, and mixing in an inactive gas environment, such as nitrogen or argon, is also preferable. A particularly useful technique is to add any fillers in the beginning of the mixing cycle in order to take maximum advantage of heating time and to prevent surface bleeding and overheating when forming the molded articles.

The resultant gel composition may be molded in appropriate press ovens and the like to form products in the form of extruded pellets, cut dices, preferably as small as possible since smaller pellets provide short heating times and better flow when utilized in flow molding. Ground pellets may also be utilized.

The extended grafted copolymers of the present invention can be used in high temperature applications including uses in injection molding or in any other compositions typically used for elastomeric properties.

In summary, the molded polymers produced from the gels containing extended grafted poly(alkenyl benzene-co-maleimide)- polypropylene- hydrogenated block copolymer compositions of the present invention retain elastomeric characteristics and are useful in high temperature applications and/or high damping applications.

Damping is the absorption of mechanical energy by a material in contact with the source of that energy. It is desirable to damp or mitigate the transmission of mechanical energy from, e.g., a motor, engine, or power source, to its surroundings. Elastomeric materials are often used for this purpose. It is desirable that such materials be highly effective in converting this mechanical energy into heat rather than transmitting it to the surroundings. It is further desirable that this damping or conversion is effective over a wide range of temperatures and frequencies commonly found near motors, automobiles, trucks, trains, planes, and the like.

A convenient measurement of damping is the determination of a parameter called tan $\delta$. A forced oscillation is applied to a material at frequency f and the transmitted force and phase shift are measured. The phase shift angle delta is recorded. The value of tan $\delta$ is proportional to the ratio of (energy dissipated)/(energy stored). The measurement can be made by any of several commercial testing devices, and may be made by a sweep of frequencies at a fixed temperature, then repeating that sweep at several other temperatures, followed by the development of a master curve of tan $\delta$ vs. frequency by curve alignment. An alternate method is to measure tan $\delta$ at constant frequency (such as at 10 hz) over a temperature range. We have defined a thermoplastic unfilled material as useful for damping when tan $\delta$>~0.3 over at least a 4 decade range, preferably a 6 decade range of frequency.

It is further important that this high degree of absorption of energy be accompanied by good mechanical and thermal stability, as the part prepared from the subject polymers will be cycled through various environments and repeatedly such to various forces of compression, tension, bending, and the like.

The compositions of the present invention are favorably used in the manufacturing of any product in which the following properties are advantageous: a high degree of softness, heat resistance, decent mechanical properties, elasticity and/or high damping. The compositions of the present invention can be used in all industry fields, in particular, in the fabrication of automotive parts, tire tread rubbers, household electrical appliances, industrial machinery, precision instruments, transport machinery, constructions, engineering, and medical instruments.

Representative examples of the use of the extended graft polymers of the present invention are in the fabrication of damping materials and vibration restraining materials. These uses involve connecting materials such as sealing materials, packing, gaskets and grommets, supporting materials such as mounts, holders and insulators, and cushion materials such as stoppers, cushions, and bumpers. These materials are also used in equipment producing vibration or noise and household electrical appliances, such as in air-conditioners, laundry machines, refrigerators, electric fans, vacuums, driers, printers and ventilator fans. Further, these materials are also suitable for impact absorbing materials in audio equipment and electronic or electrical equipment, sporting goods and shoes. Further, as super low hardness rubbers, these materials are applicable for use in appliances, damping rubbers, and as low hardness plastics, and it is preferable for molding materials. Further, because the present compositions can be used to control the release of internal low molecular weight materials out from the compositions, it is useful as a release support to emit materials such as fragrance materials, medical materials and other functional materials. The compositions of the present invention also possess utility in applications of use in liquid crystals, adhesive materials and coating materials.

Specific examples of uses of the compositions of the present invention as damping materials are as follows:

in audio equipment, such as in insulators for a portable CD or a CD mounted on a vehicle, mike holders for home video cassette recorder, radio cassette recorder, karaoke or handy mike, etc., an edge cone of a speaker, a tape holder of a radio cassette, a holder of a portable mini-disk player, an optical disk holder of a digital video disk, etc.;

in information relating equipment, such as in insulators for a hard disk, insulators for motors such as a spindle motor for HID and stepping motor, insulators for floppy disk drive, insulators for CD-ROM of personal computer, and a holder for optical disk;

in communication equipment, such as in a holder for compact high performance mike or speaker of a portable telephone, a pocket bell or PHS, a mike holder for a wireless equipment, and a disk holder for portable note type electronic equipment;

in home electronics equipment, such as in insulators for CD-ROM of home TV game, insulators for cassette holder or CD-ROM of cassette holder or game machine, a holder of high performance mike, and cone edge of speaker; and in other applications, such as in damping materials for printer head of a wordprocessor, printer of personal computer, small or middle handy type printer, or name printers, and insulators for CD-ROM used for measure equipment.

In the following, the present invention will be described in more detail with reference to non-limitative examples. The following examples and tables are presented for purposes of illustration only and are not to be construed in a limiting sense.

EXAMPLE 1

Preparation of the Centipede Polymer

A nitrogen purged Brabender mixer (~310 g capacity) equipped with a Banbury blade was initially set to 30 rpm and the temperature was set to 165° C. The mixer was then charged with 150 g of poly(styrene-alt-maleic anhydride) (obtained from Aldrich Chemical Company of 1001 West Saint Paul Avenue, Milwaukee, Wis. Catalog Number:

18,293-1, CAS Number: 9011-13-6)($M_n$=350,000) and 34.5 g of dodecyl amine (obtained from Aldrich, 98% purity). The mixture was agitated in the mixer for 10 minutes, and then a second charge of 34.5 g of dodecyl amine was added into the mixer. After an additional ten minutes of mixing, a third charge of 34.5 g of dodecyl amine was added into the mixer. After an additional ten minutes of mixing, a fourth charge of 34.5 g of dodecyl amine was added into the mixer. Accordingly, a total of 138 g of dodecyl amine was added into the mixer during a 40 minute period. The mixing was then continued for 30 minutes. The agitation speed was then adjusted to 60 rpm, the temperature was adjusted to 205° C., and mixing was continued for an additional 65 minutes. The agitation speed was then slowed to 15 rpm and the heating element was turned off and the product was allowed to cool to about 150° C. at a rate ~4° C./min. The agitation was turned off and the product was removed from the mixer. The intrinsic viscosity of the final product was 0.50 as measured in tetrahydrofuran at 25° C. The acid value of the final product was 0.134 mg/g using the NaOH titration method in a tetrahydrofuran solution.

EXAMPLE 2

Grafting of the Centipede Polymer and Maleated Polypropylene and SEBS

A nitrogen purged Brabender mixer (~310 g capacity) equipped with a Banbury blade was initially set to 60 rpm and the temperature was set to 195° C. The mixer was charged with 40 g of Exxelor PO 1015, a commercial maleated polypropylene from the Exxon Chemical Company. After 3 minutes, a charge of 160 g of Kraton G1901X, a commercial maleated SEBS from the Shell Chemical Company was added into the mixer. The polymers were agitated in the mixer for 12 minutes. A charge of 1.6 g dodecane diamine (from Aldrich, 98% purity) was then added into the Brabender mixer while the agitation speed was adjusted to 120 rpm. The torque of the mixing started to increase and three minutes later when the temperature rose to 209° C., the heating element was turned off and the agitation speed was set to 60 rpm. The mixture was allowed to cool to about 160° C. at a rate ~4° C./min. Finally, the agitation was turned off and the polymer was removed from the mixer.

EXAMPLE 3

A nitrogen purged Brabender mixer (~310 g capacity) equipped with a Banbury blade was initially set to 60 rpm and the temperature was set to 195° C. The mixer was initially charged with 40 g of commercial maleated polypropylene ( Exxelor PO 1015). After three minutes, a charge of 100 g of commercial maleated SEBS (Kraton G-1901X) was added into the mixer. After another 3 minutes, a charge of 60 g of the polymer prepared in Example 1 was added into the mixer. The polymers were agitated in the mixer for additional 12 minutes. A charge of 1.6 g dodecane diamine (from Aldrich, 98% purity) was added in the Brabender mixer and the agitation speed was adjusted to 120 rpm. The torque of the mixing increased and five minutes later when the temperature rose to 205° C., the agitation speed was then set to 60 rpm. After 10 minutes, the agitation speed was re-set to 120 rpm for 5 minutes. Then, the heating element was turned off and the agitation speed was set back to 60 rpm. The mixture was allowed to cool to about 160° C. at a rate ~4° C./min. Finally, the agitation was turned off and the graft copolymer product was removed from the mixer.

EXAMPLE 4

A charge of 15 g of the product of Example 2 was added to a Brabender mixer (50 g capacity) equipped with a roller blade. The mixer was initially set to 50° C. and 20 rpm and a charge of 17.7 g of aromatic oil was slowly charged into the mixer. After eight minutes, the temperature of the mixer was set to 205° C. and the agitation speed was adjusted to 70 rpm. After 32 minutes of continuously mixing, a charge of 8.9 g of aromatic oil was added into the mixer. After additional 30 minutes continuously mixing, another charge of 8.9 g of aromatic oil was added into the mixer. The material was further mixed at 70 rpm for 30 minutes after the addition of oil (a total of 35.5 g) was completed. The mixing speed was deecreased to 20 rpm, the heating element was then turned off and the mixture was then allowed to cool down at a rate ~4° C./min to 150° C. The agitation was turned off and the mixture was removed from the mixer.

EXAMPLE 5

The procedure of Example 4 were repeated with change of polymer used. The mixer was charged with 15.0 g of the product from Example 3 and 35.5 g of heavy aromatic oil.

The products recovered from Examples 4 and 5 were molded into sheets and cylinder buttons at ~155° C. Ring samples were cut from these sheets for tensile measurement. The product that includes the centipede polymers displayed better damping properties than that of control over a range from 20 to 75° C. The centipede polymer, as example shown here, particularly promotes the damping properties around room temperature, i.e., ~20° C. The detail of physical properties of the final materials are listed below in Table 1.

TABLE 1

| Example No. | Polymer Used | Oil Type (content) | PP/SEBS/ Polymer of Ex. 1 (wt) | C.S.[1] (100° C.) | Tb/Eb (psi/%) | Tan δ (20° C.) | Tan δ (65° C.) | Tan δ (95° C.) | Shore A hardness (25° C.) |
|---|---|---|---|---|---|---|---|---|---|
| Example 4 | Example 2 (control) | Aromatic (70%) | 20/80/0 | 52.9 | 41/245 | 0.21 | 0.57 | 0.50 | 11 |
| Example 5 | Example 3 | Aromatic (70%) | 20/50/30 | 49.6 | 32/238 | 0.41 | 0.50 | 0.28 | 12 |

[1]The Compression Set (C.S.) was measured based on conditions of ASTM D395-89, except that the sample size and displacement were changed as follows: Sample height - 0.5 inches; Sample diameter - 0.55 inches; Displacement - Sample is compressed to 0.375 inches and stored in an oven at 100° C. (or at 150° C. in subsequent examples) for 22 hours. The sample is removed from the oven, the stress on the sample is relieved, the sample is stored at roomtemperature for 30 minutes and the recovery of the sample is measured as the final sample height as X in: Compression Set = ((0.5 − X)/(0.5 − 0.375)) × 100%.

Although the invention has been described with reference to particular means, materials and embodiments it is to be understood that the invention is not limited to the particulars disclosed and extends to all equivalents within the scope of the claims.

We claim:

1. A method for the formation of a graft copolymer, comprising:

reacting from about 10 wt % to about 50 wt % of a poly(alkenyl benzene-co-maleimide) and about 90 wt % to about 50 wt % of a mixture of a maleated polyalkylene and a maleated hydrogenated block copolymer in a weight ratio of from 10:1 to 1:10, and from about 0.1 to about 10 wt % of a diamine under substantially dry conditions sufficient to form a hydrogenated block copolymer-polyalkylene grafted poly(alkenyl benzene-co-maleimide) polymer.

2. The method of claim 1, further comprising the step of: mixing said hydrogenated block copolymer-polyalkylene grafted poly(alkenyl benzene-co-maleimide) polymer with an extender oil in an amount sufficient to from a gel.

3. The method of claim 1, further comprising the step of: mixing about 10 wt % to about 90 wt % of said graft copolymer with about 90 wt % to about 10 wt % of an extender oil.

4. The method of claim 1, wherein the alkenylbenzene contributed monomer units of said poly(alkenyl benzene-co-maleimide) is selected from the group consisting of: styrene, α-methylstyrene, p-methylstyrene, 4-phenylstyrene, m-methylstyrene, o-methylstyrene, p-tert-butylstyrene, dimethylstyrene, and mixtures thereof.

5. The method of claim 1, wherein the alkylene contributed monomer units of said maleated polyalkylene is selected from the group consisting of: ethylene, propylene and mixtures thereof.

6. The method of claim 1 wherein the maleimide contributed monomer units of the poly(alkenyl benzene-co-maleimide) is formed by the reaction of maleic anhydride and a primary amine.

7. The method of claim 6 wherein the primary amine is selected from the group consisting of: alkyl amines; alkyl benzyl amines; alkyl phenyl amines; alkoxybenzyl amines; alkyl aminobenzoates; and alkoxy aniline; containing from 1 to 50 carbon atoms in the allyl and alkoxy substituents in the primary amine.

8. The method of claim 1 wherein said diamine is selected from the group consisting of: aliphatic or cycloaliphatic diamines corresponding to the following general formula: $R_1(NH_2)_2$ wherein $R_1$ represents an aliphatic hydrocarbon group having from 2 to 20 carbon atoms, a cycloaliphatic hydrocarbon group having from 4 to 20 carbon atoms, or an aromatic hydrocarbon group having from 6 to 20 carbon atoms or $R_1$ represents an N-hetero cyclic ring having from 4 to 20 carbon atoms.

9. The method of claim 1 wherein said diamine is selected from the group consisting of: ethylene diamine; 1,2- and 1,3-propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl- 3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-; 1,4-; 1,5- and 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4 - bis-(2-aminoethyl)-benzene; benzidine; 4,4'-thiodianiline, 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminophenyl) sulfone; diaminodiphenylsulfone; 4-chloro-o-phenylenediamine; m-aminobenzylamine; m-phenylenediamine; 4,4'-$C_1$–$C_6$-dianiline such as 4,4'-methylenedianiline; aniline-formaldehyde resin; trimethylene glycol di-p-aminobenzoate; bis-(2-aminoethyl)-amine, bis-(3-aminopropyl)-arnine, bis-(4-aminobutyl)-amine; bis-(6-aminohexyl)-amine, isomeric mixtures of dipropylene triamine and dibutylene triamine; and mixtures thereof.

10. The method of claim 1, wherein the maleated hydrogenated block copolymer comprises a hydrogenated block copolymer portion produced by hydrogenating a block copolymer which comprises two or more polymer blocks A composed mainly of a vinyl-substituted aromatic hydrocarbon and two or more polymer blocks B composed mainly of a conjugated diene and the content of the vinyl-substituted aromatic hydrocarbon bonded is 10 to 50 wt. %, thereby reducing the content of the unsaturated bond of the polymer block B after hydrogenation to 80 mole % or more of that of the polymer block B before hydrogenation.

11. The method of claim 1, wherein the maleated hydrogenated block copolymer comprises a hydrogenated block copolymer portion selected from the group consisting of: styrene-ethylene/butylene-styrene block copolymer (SEBS), styrene-ethylenetbutylene block copolymer (SEB), styrene-ethylene/propylene-block copolymer (SEP), styrene-ethylene/propylene-styrene block copolymer (SEPS), styrene-ethylene/propylene-ethylene block copolymer (SEPE), styrene-ethylene/butylene-ethylene block copolymer (SEBE), styrene-ethylene/styrene block copolymer (SES), ethylene-ethylene/butylene block copolymer (EEB), ethylene-ethylene/butylene/styrene block copolymer (hydrogenated BR-SBR block copolymer), ethylene-ethylene/butylene/styrene- ethylene block copolymer (hydrogenated BR-SBR-BR block copolymer), ethylene-ethylene/butylene-ethylene block copolymer (EEBE).

12. The method of claim 1, wherein the maleated hydrogenated block copolymer is a maleated styrene-ethylene/butylene-styrene block copolymer (SEBS).

13. A hydrogenated block copolymer-polyalkylene grafted poly(alkenyl benzene-co-maleimide) polymer comprising from about 10 wt % to about 50 wt % of a poly(alkenyl benzene-co-maleimide) and about 90 wt % to about 50 wt % of: grafted maleated polyalkylene and grafted maleated hydrogenated block copolymer in a weight ratio of from 10:1 to 1:10.

14. The hydrogenated block copolymer-polyalkylene grafted poly(alkenyl benzene-co-maleimide) polymer of claim 13, additionally comprising an extender in an amount sufficient to form a gel.

15. The polymer of claim 14 wherein the weight percent ratio of said hydrogenated block copolymer-polyalkylene grafted poly(alkenyl benzene-co-maleimide) to said extender is from about 100:1 to about 1:100.

16. The polymer of claim 14 wherein the weight percent ratio of said hydrogenated block copolymer-polyalkylene grafted poly(alkenyl benzene-co-maleimide) to said extender is from about 5:1 to about 1:5.

17. The polymer of claim 13, wherein the monomer for forming the alkenyl benzene moiety of said poly(alkenyl benzene-co-maleimide) is selected from the group consisting of: styrene, α-methylstyrene, p-methylstyrene, 4-phenylstyrene, m-methylstyrene, o-methylstyrene, p-tert-butylstyrene, dimethylstyrene, and mixtures thereof.

18. The polymer of claim 13, wherein the monomer for forming the alkylene moiety of said maleated polyalkylene is selected from the group consisting of ethylene, propylene and combinations thereof.

19. The polymer of claim 13, wherein the maleated hydrogenated block copolymer comprises a hydrogenated block copolymer portion produced by hydrogenating a block copolymer which comprises two or more polymer blocks A composed mainly of a vinyl-substituted aromatic hydrocarbon and two or more polymer blocks B composed mainly of a conjugated diene and the content of the vinyl-substituted aromatic hydrocarbon bonded is 10 to 50 wt. %, thereby reducing the content of the unsaturated bond of the polymer block B after hydrogenation to 80 mole % or more of that of the polymer block B before hydrogenation.

20. The polymer of claim 13, wherein the maleated hydrogenated block copolymer comprises a hydrogenated block copolymer portion selected from the group consisting of: styrene-ethylene/butylene-styrene block copolymer (SEBS), styrene-ethylene/butylene block copolymer (SEB), styrene-ethylene/propylene-block copolymer (SEP), styrene-ethylene/propylene-styrene block copolymer (SEPS), styrene-ethylenelpropylene-ethylene block copolymer (SEPE), styrene-ethylene/butylene-ethylene block copolymer (SEBE), styrene-ethylene/styrene block copolymer (SES), ethylene-ethylene/butylene block copolymer (EEB), ethylene-ethylene/butylene/styrene block copolymer (hydrogenated BR-SBR block copolymer), ethylene-ethylene/butylene/styrene- ethylene block copolymer (hydrogenated BR-SBR-BR block copolymer), ethylene-ethylene/butylene-ethylene block copolymer (EEBE).

21. The polymer of claim 13,, wherein the maleated hydrogenated block copolymer is a maleated styrene-ethylene/butylene-styrene block copolymer (SEBS).

22. The polymer of claim 13, wherein said poly(alkenyl benzene-co-maleimide) is grafted to the maleated polyalkylene and the maleated hydrogenated block copolymer using a diamine grafting agent selected from the group consisting of: ethylene diamine; 1,2- and 1,3- propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11 -diaminoundecane; 1,12-diaminododecane; 1-methyl-4-(aminoisopropyl)-cyclohexylamine; 3-aminomethyl- 3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-; 1,4-; 1,5- and 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4 - bis-(2-aminoethyl)-benzene; benzidine; 4,4'-thiodianiline, 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminophenyl) sulfone; diaminodiphenylsulfone; 4-chloro-o-phenylenediamine; m-aminobenzylamine; m-phenylenediamine; 4,4'-$C_1$--$C_6$-dianiline such as 4,4'-methylenedianiline; aniline-formaldehyde resin; trimethylene glycol di-p-aminobenzoate; bis-(2-aminoethyl)-amine, bis-(3-aminopropyl)-amine, bis-(4-aminobutyl)-amine; bis-(6-aminohexyl)-amine, isomeric mixtures of dipropylene triamine and dibutylene triamine; and mixtures thereof.

23. The gel of claim 14, wherein the gel has damping properties having a tan δ in the range of about 1 to about 0.10 over the temperature range of −10° C. to 100° C.

24. The gel of claim 14, wherein the gel has a Shore A hardness ranging from about 0 to about 50 at about 20° C. to 25° C.

25. The polymer of claim 13, further comprising from 1 to 350 parts of a inorganic filler, additive or compounding ingredient based on 100 parts by weight of the grafted polymer.

26. The gel of claim 14 wherein the extender is at least one compound selected from the group consisting of: softening agents, plasticizers, tackifiers, oligomers, lubricants, petroleum hydrocarbons, silicone oil, aromatic oil, naphthenic oil and paraffinic oil.

* * * * *